(12) United States Patent
Ossyra

(10) Patent No.: US 9,352,734 B2
(45) Date of Patent: May 31, 2016

(54) BRAKE INTERFACE CIRCUIT FOR HYBRID DRIVE SYSTEM

(75) Inventor: Jean-Claude Ossyra, Olive Branch, MS (US)

(73) Assignee: Parker-Hannifin Corporation, Cleveland, OH (US)

( * ) Notice: Subject to any disclaimer, the term of this patent is extended or adjusted under 35 U.S.C. 154(b) by 568 days.

(21) Appl. No.: 12/468,275

(22) Filed: May 19, 2009

(65) Prior Publication Data

US 2009/0283348 A1  Nov. 19, 2009

Related U.S. Application Data

(60) Provisional application No. 61/054,268, filed on May 19, 2008.

(51) Int. Cl.

| | | |
|---|---|---|
| B60T 8/64 | (2006.01) |
| B60T 13/68 | (2006.01) |
| B60L 7/24 | (2006.01) |
| B60T 13/58 | (2006.01) |
| B60T 1/10 | (2006.01) |
| B60T 8/32 | (2006.01) |
| B60T 8/36 | (2006.01) |
| B60K 6/22 | (2007.10) |

(52) U.S. Cl.
CPC .............. B60T 13/686 (2013.01); B60L 7/24 (2013.01); B60T 1/10 (2013.01); B60T 8/327 (2013.01); B60T 8/361 (2013.01); B60T 13/586 (2013.01); B60K 6/22 (2013.01); B60T 2270/604 (2013.01)

(58) Field of Classification Search
None
See application file for complete search history.

(56) References Cited

U.S. PATENT DOCUMENTS

| | | | |
|---|---|---|---|
| 4,989,921 A | | 2/1991 | Vanzeyl |
| 5,253,929 A | * | 10/1993 | Ohori ............................... 303/3 |
| 5,322,352 A | | 6/1994 | Ohno et al. |
| 5,378,053 A | | 1/1995 | Patient et al. |
| 5,568,962 A | | 10/1996 | Enomoto et al. |

(Continued)

FOREIGN PATENT DOCUMENTS

| | | |
|---|---|---|
| JP | 05-161210 | 6/1993 |
| JP | 09-002096 | 1/1997 |

(Continued)

OTHER PUBLICATIONS

Extended European Search Report, Application No. 09160701.0, dated Mar. 13, 2014.

*Primary Examiner* — Nicholas J Lane
(74) *Attorney, Agent, or Firm* — MacMillan, Sobanski & Todd, LLC

(57) ABSTRACT

A brake interface circuit for use with a hybrid drive system includes a brake interface circuit for selectively enabling and disabling the operation of a brake that is actuated by an actuator. The brake interface circuit includes a brake cylinder and an actuator control valve that is adapted to selectively enable and disable the operation of the brake by the actuator. First and second control valves are connected between the brake cylinder and the actuator control valve. The brake interface circuit is operable in a first operating mode to cause the actuator control valve to enable the operation of the brake by the actuator, a second operating mode to cause the actuator control valve to disable operation of the brake by the actuator, and a third operating mode to cause the actuator control valve to enable the operation of the brake by the actuator even though a portion of the brake interface circuit is operated in the second operating mode.

10 Claims, 7 Drawing Sheets

(56) References Cited

U.S. PATENT DOCUMENTS

| | | |
|---|---|---|
| 6,120,115 A | 9/2000 | Manabe |
| 6,132,015 A * | 10/2000 | Aoyama .................. 303/152 |
| 6,371,573 B1 * | 4/2002 | Goebels et al. ............ 303/113.1 |
| 6,494,547 B2 * | 12/2002 | Higashimura et al. ........ 303/152 |
| 6,724,165 B2 | 4/2004 | Hughes |
| 6,968,918 B2 | 11/2005 | Chernoff et al. |
| 7,047,120 B2 | 5/2006 | Perach et al. |
| 7,311,163 B2 | 12/2007 | Oliver |
| 2005/0143877 A1 | 6/2005 | Cikanek et al. |
| 2005/0231033 A1 * | 10/2005 | Ganzel ..................... 303/152 |
| 2007/0013230 A1 | 1/2007 | Yang |
| 2007/0107958 A1 | 5/2007 | Oliver |
| 2008/0000381 A1 | 1/2008 | Bartley et al. |
| 2008/0017425 A1 | 1/2008 | Albrichsfeld et al. |
| 2009/0108672 A1 * | 4/2009 | Joyce ....................... 303/152 |

FOREIGN PATENT DOCUMENTS

| | | |
|---|---|---|
| JP | 09-100853 | 4/1997 |
| JP | 05-161212 | 6/1999 |
| JP | 05-161213 | 6/1999 |

* cited by examiner

BRAKE INTERFACE CIRCUIT FOR HYBRID DRIVE SYSTEM

CROSS-REFERENCE TO RELATED APPLICATIONS

This application claims the benefit of U.S. Provisional Application No. 61/054,268 filed May 19, 2008, the disclosure of which is incorporated herein by reference.

BACKGROUND OF THE INVENTION

This invention relates in general to hybrid drive systems for vehicles and other devices having rotatably driven mechanisms. In particular, this invention relates to a brake interface circuit that can (1) selectively disable standard brakes provided for retarding the rotation of the rotatably driven mechanism and thereby allow the hybrid drive system to recover a maximum amount of energy during braking of the rotatably driven mechanism and (2) thereafter reliably re-enable the standard brakes for retarding the rotation of the rotatably driven mechanism when needed.

Drive train systems are widely used for generating power from a source and for transferring such power from the source to a driven mechanism. Frequently, the source generates rotational power, and such rotational power is transferred from the source of rotational power to a rotatably driven mechanism. For example, in most land vehicles in use today, an engine generates rotational power, and such rotational power is transferred from an output shaft of the engine through a driveshaft to an input shaft of an axle so as to rotatably drive the wheels of the vehicle.

In some vehicles and other mechanisms, a hybrid drive system is provided in conjunction with the drive train system for accumulating energy during braking of the rotatably driven mechanism and for using such accumulated energy to assist in subsequently rotatably driving the rotatably driven mechanism. To accomplish this, a typical hybrid drive system includes an energy storage device and a reversible energy transfer machine. The reversible energy transfer machine communicates with the energy storage device and is mechanically coupled to a portion of the drive train system. Typically, the hybrid drive system can be operated in either a retarding mode, a neutral mode, or a driving mode. In the retarding mode, the reversible energy transfer machine of the hybrid drive system accumulates energy by braking or otherwise retarding the rotatably driven mechanism of the drive train system and stores such energy in the energy storage device. In the neutral mode, the hydraulic drive system is disconnected from the drive train system and, therefore, is substantially inoperative to exert any significant driving or retarding influence on the rotatably driven mechanism. In the driving mode, the reversible energy transfer machine of the hybrid drive system supplies the accumulated energy previously stored in the energy storage device to assist in subsequently rotatably driving the rotatably driven mechanism.

One commonly known hybrid drive system uses pressurized fluid as the actuating mechanism. In such a hydraulic hybrid drive system, a fluid energy storage device (such as an accumulator) and a reversible hydraulic machine are provided. Another commonly known hybrid drive system uses electricity as the actuating mechanism. In such an electric hybrid drive system, an electrical energy storage device (such as a battery) and a reversible electric machine are provided. Other hybrid drive systems are known in the art that use other actuating mechanisms. Regardless of the specific actuating mechanism that is used, the hybrid drive system can improve the performance of the drive train system (such as fuel economy, for example) by recovering and storing energy during deceleration and by retrieving and supplying the stored energy for use during a subsequent acceleration.

Although hybrid drive systems of this general type function in an energy-efficient manner, it is often necessary or desirable to provide a separate brake system to affirmatively slow or stop the rotation of the rotatably driven mechanism in certain situations. For example, when used in conjunction with the drive train system of a vehicle that is relatively heavy or moving relatively fast, the hybrid drive system may not always have the capacity to adequately retard the rotation of the rotatably driven mechanism as quickly as requested by a driver. Additionally, when used in conjunction with the drive train system of a vehicle that is stopped on an inclined surface, the hybrid drive system cannot positively stop the rotatably driven mechanism to prevent any movement of the vehicle. To address these and other situations, the separate brake system (which can be embodied as a conventional pneumatically or hydraulically actuated friction brake system) is often provided in conjunction with the hybrid drive system. In such a combined hybrid drive and brake system, the hybrid drive system can be actuated to normally retard the rotation of the rotatably driven mechanism in the energy-efficient manner described above, and the brake system can be actuated when otherwise necessary.

In a combined hybrid drive and brake system such as described above, deceleration of the rotatably driven mechanism can be accomplished by either (1) the brake system operating alone, (2) the hybrid drive system operating alone, or (3) both the brake system and the hybrid drive system operating in combination. The selection of which of these three operating modes is appropriate can be determined by a control apparatus in accordance with a variety of parameters. However, as mentioned above, the hybrid drive system alone may not always be able adequately retard or prevent the rotation of the rotatably driven mechanism when requested by a driver. Thus, it would be desirable to provide a brake interface circuit that can (1) selectively disable such standard brakes to allow the hybrid drive system to recover a maximum amount of energy during braking of the rotatably driven mechanism and (2) thereafter reliably re-enable the standard brakes for retarding the rotation of the rotatably driven mechanism when needed.

SUMMARY OF THE INVENTION

This invention relates to a brake interface circuit that can (1) selectively disable standard brakes provided for retarding the rotation of the rotatably driven mechanism and thereby allow the hybrid drive system to recover a maximum amount of energy during braking of the rotatably driven mechanism and (2) thereafter reliably re-enable the standard brakes for retarding the rotation of the rotatably driven mechanism when needed. To accomplish this, the brake interface circuit selectively enables and disables the operation of a brake that is actuated by an actuator. The brake interface circuit includes a brake cylinder and an actuator control valve that is adapted to selectively enable and disable the operation of the brake by the actuator. First and second control valves are connected between the brake cylinder and the actuator control valve. The brake interface circuit is operable in a first operating mode to cause the actuator control valve to enable the operation of the brake by the actuator, a second operating mode to cause the actuator control valve to disable operation of the brake by the actuator, and a third operating mode to cause the actuator control valve to enable the operation of the brake by the actuator even though a portion of the brake interface circuit is operated in the second operating mode.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
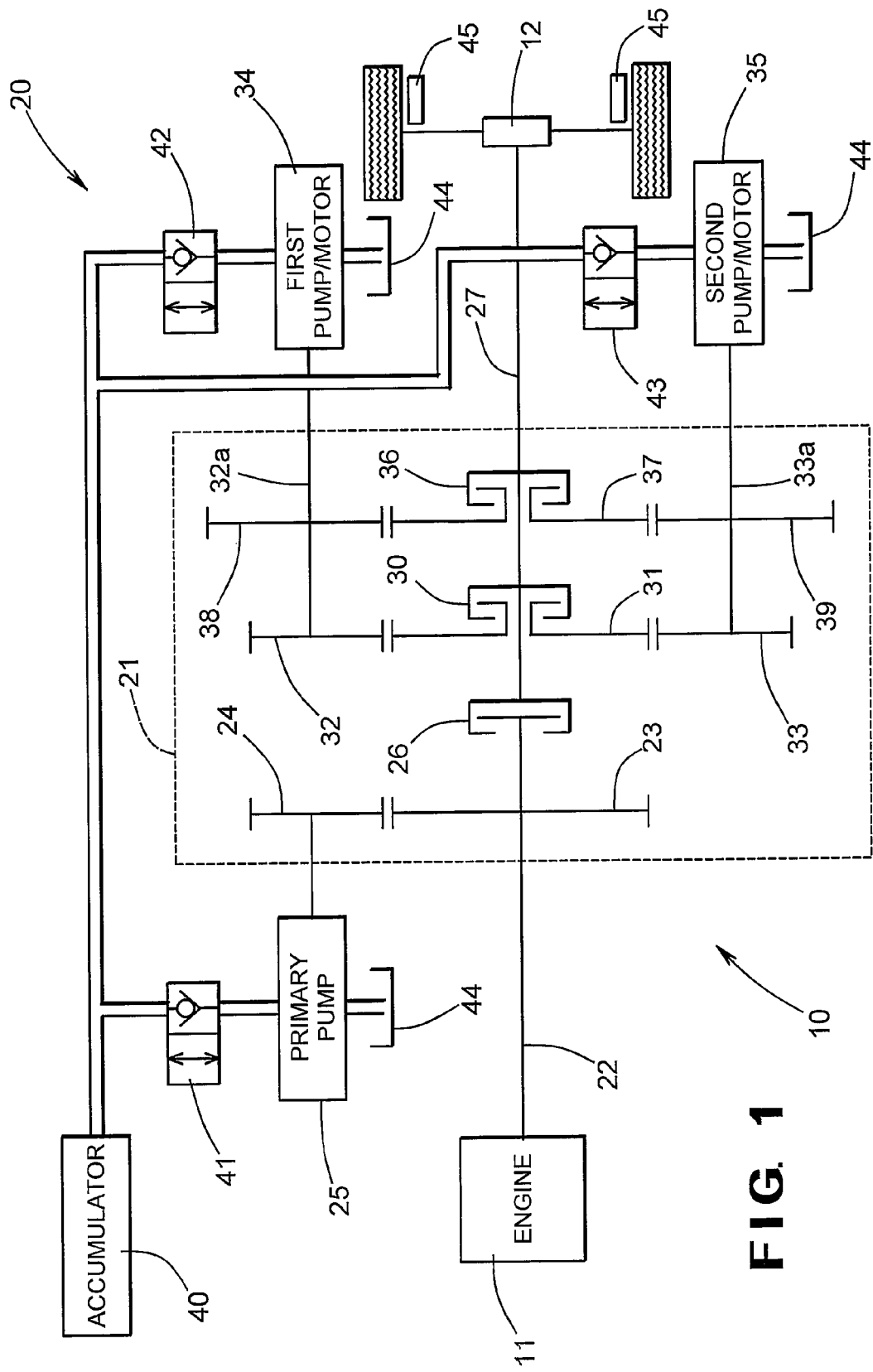
FIG. 1 is a schematic diagram of a drive train system including a combined hybrid drive and brake system that can be used in conjunction with the brake interface circuit of this invention.

Referring now to the drawings, there is illustrated in FIG. 1 a drive train system, indicated generally at 10, for generating power from a source and for transferring such power from the source to a driven mechanism. The illustrated drive train system 10 is a vehicular drive train system that includes an engine 11 that generates rotational power to an axle assembly 12 by means of a combined hybrid drive and brake system, indicated generally at 20. However, the illustrated vehicle drive train system 10 is intended merely to illustrate one environment in which this invention may be used. Thus, the scope of this invention is not intended to be limited for use with the specific structure for the vehicular drive train system 10 illustrated in FIG. 1 or with vehicle drive train systems in general. On the contrary, as will become apparent below, this invention may be used in any desired environment for the purposes described below.

The illustrated combined hybrid drive and brake system 20 includes a power drive unit 21 that is connected between the engine 11 and the axle assembly 12. The illustrated power drive unit 21 is, in large measure, conventional in the art and is intended merely to illustrate one environment in which this invention may be used. Thus, the scope of this invention is not intended to be limited for use with the specific structure for the power drive unit 21 illustrated in FIG. 1. The illustrated power drive unit 21 includes an input shaft 22 that is rotatably driven by the engine 11. An input gear 23 is supported on the input shaft 22 for rotation therewith. The input gear 23 is connected for rotation with a primary pump drive gear 24 that, in turn, is connected for rotation with an input shaft of a primary pump 25. Thus, the primary pump 25 is rotatably driven whenever the engine 11 is operated. The purpose of the primary pump 25 will be explained below.

The illustrated power drive unit 21 also includes a main drive clutch 26 that selectively connects the input shaft 22 to an output shaft 27. When the main drive clutch 26 is engaged, the input shaft 22 is connected for rotation with the output shaft 27. When the main drive clutch 26 is disengaged, the input shaft 22 is not connected for rotation with the output shaft 27. The output shaft 27 is connected for rotation with an input shaft of the axle assembly 12. Thus, the axle assembly 12 is rotatably driven by the engine 11 whenever the main drive clutch 26 is engaged.

The illustrated power drive unit 21 further includes a low drive clutch 30 that selectively connects the output shaft 27 to a low drive clutch gear 31. The low drive clutch output gear 31 is connected for rotation with both a first low drive output gear 32 and a second low drive output gear 33. The first low drive output gear 32 is connected for rotation with a first shaft 32a that, in turn, is connected for rotation with an input shaft of a first pump/motor 34. Similarly, the second low drive output gear 33 is connected for rotation with a second shaft 33a that, in turn, is connected for rotation with an input shaft of a second pump/motor 35. Thus, when both the main drive clutch 26 and the low drive clutch 30 are engaged, the output shaft 27 rotatably drives both the first pump/motor 34 and the second pump motor 35. The purpose for both the first pump/motor 34 and the second pump motor 35 will be explained below.

Similarly, the illustrated power drive unit 21 further includes a high drive clutch 36 that selectively connects the output shaft 27 to a high drive clutch gear 37. The high drive clutch output gear 37 is connected for rotation with both a first high drive output gear 38 and a second high drive output gear 39. The first high drive output gear 38 is connected for rotation with the first shaft 32a that, as mentioned above, is connected for rotation with the input shaft of the first pump/motor 34. Similarly, the second high drive output gear 39 is connected for rotation with the second shaft 33a that, as also mentioned above, is connected for rotation with the input shaft of the second pump/motor 35. Thus, when both the main drive clutch 26 and the high drive clutch 36 are engaged, the output shaft 27 rotatably drives both the first pump/motor 34 and the second pump motor 35. The low drive gears 31, 32, and 33 are selected to provide a relatively low gear ratio when the main drive clutch 26 and the low drive clutch 30 are engaged, in comparison with the relatively high gear ratio provided by the high drive gears 37, 28, and 39 when the main drive clutch 26 and the high drive clutch 36 are engaged.

The illustrated power drive unit 21 also includes an accumulator 40 or similar relatively high fluid pressure storage device. The accumulator 40 selectively communicates with a first port of the primary pump 25 through a primary pump valve 41. The primary pump valve 41 is conventional in the art and can be operated in a first position (shown in FIG. 1), wherein fluid communication from the accumulator 40 to the first port of the primary pump 25 is prevented and fluid communication from the first port of the primary pump 25 to the accumulator 40 is permitted. However, the primary pump valve 41 can be operated in a second position (to the right when viewing FIG. 1), wherein fluid communication from the accumulator 40 to the first port of the primary pump 25 is permitted and fluid communication from the first port of the primary pump 25 to the accumulator 40 is permitted. For the purposes of this invention, the primary pump valve 41 is always maintained in the illustrated first position, wherein fluid communication from the accumulator 40 to the first port of the primary pump 25 is prevented and fluid communication from the first port of the primary pump 25 to the accumulator 40 is permitted.

The accumulator 40 also selectively communicates with a first port of the first pump/motor 34 through a first control valve 42. The first control valve 42 is conventional in the art and can be operated in a first position (shown in FIG. 1), wherein fluid communication from the first port of the first pump/motor 34 to the accumulator 40 is permitted and fluid communication from the accumulator 40 to the first port of the first pump/motor 34 is prevented. However, the first control valve 42 can be operated in a second position (to the right when viewing FIG. 1), wherein fluid communication from the first port of the first pump/motor 34 to the accumulator 40 is permitted and fluid communication from the accumulator 40 to the first port of the first pump/motor 34 is permitted.

The accumulator 40 further selectively communicates with a first port of the second pump/motor 35 through a second control valve 43. The second control valve 43 is conventional in the art and can be operated in a first position (shown in FIG. 1), wherein fluid communication from the first port of the second pump/motor 35 to the accumulator 40 is permitted and fluid communication from the accumulator 40 to the first port of the second pump/motor 35 is prevented. However, the second control valve 43 can be operated in a second position (to the right when viewing FIG. 1), wherein fluid communication from the first port of the second pump/motor 35 to the accumulator 40 is permitted and fluid communication from the accumulator 40 to the first port of the second pump/motor 35 is permitted.

The illustrated power drive unit 21 further includes a reservoir 44 or similar relatively low fluid pressure storage device. Each of the primary pump 25, the first pump/motor 34, and the second pump/motor 35 includes a second port, and all of such second ports communicate with the reservoir 44 to draw fluid therefrom when necessary, as described below.

The basic operation of the drive train system 10 will now be described. When the engine 11 of the drive train system 10 is initially started, the main drive clutch 26, the low drive clutch 30, and the high drive clutch 36 are all disengaged, and the valves 41, 42, and 43 are all in their first positions illustrated in FIG. 1. In this initial condition, the engine 11 rotatably drives the primary pump 25 through the input shaft, the input gear 23, and the primary pump drive gear 24, as described above. As a result, the primary pump 25 draws fluid from the reservoir 44 through the second port thereof, and further supplies such fluid under pressure from the first port of the primary pump 25 through the primary pump valve 41 to the accumulator 40. As discussed above, the first and second control valves 42 and 43 prevent the pressurized fluid from the primary pump 25 or the accumulator 40 from being supplied to the first ports of the first and second pump/motors 34 and 35, respectively. Such initially operation continues until a sufficient amount of such pressurized fluid has been supplied to the accumulator 40. Because the main drive clutch 26, the low drive clutch 30, and the high drive clutch 36 are all disengaged, the engine 11 does not rotatably drive the output shaft 27 or the axle assembly 12 in this initial operation of the drive train system 10.

When it is desired to move the vehicle, the low drive clutch 30 is engaged, while the main drive clutch 26 and the high drive clutch 36 remain disengaged. As a result, the output shaft 27 is connected to the low drive clutch gear 31 for concurrent rotation. At the same time, the first control valve 42 and the second control valve 43 are each moved to their second positions. This permits pressurized fluid from the accumulator 40 to flow to the first ports of both the first pump/motor 34 and the second pump/motor 35. Lastly, the first and second pump/motors 34 and 35 are each placed in a positive displacement mode, wherein they function as motors to use the pressurized fluid supplied by the accumulator 40 to rotatably drive the first and second shafts 32a and 33a. In turn, this causes the low drive gears 31, 32, and 33 and the output shaft 27 to be rotatably driven. As a result, the axle assembly 12 is rotatably driven at the relatively low gear ratio provided by the low drive gears 31, 32, and 33. Such a relatively low gear ratio is well suited for providing the relatively high torque needed to accelerate the vehicle from a standstill.

Once it has begun to move, it may be desirable to move the vehicle at a higher speed that is suitable for the relatively low gear ratio provided by the low drive gears 31, 32, and 33. In this instance, the power drive unit 21 can be operated to disengage the low drive clutch 30 and engage the high drive clutch 36, while maintaining the main drive clutch 26 disengaged. As a result, the output shaft 27 is connected to the high drive clutch output gear 37 for concurrent rotation. The first control valve 42 and the second control valve 43 are each moved to (or maintained in) their second positions. As described above, this permits pressurized fluid from the accumulator 40 to flow to the first ports of both the first pump/motor 34 and the second pump/motor 35. As also described above, the first and second pump/motors 34 and 35 are each placed (or maintained) in a positive displacement mode, wherein they function as motors to use the pressurized fluid supplied by the accumulator 40 to rotatably drive the first and second shafts 32a and 33a. In turn, this causes the high drive gears 37, 38, and 39 and the output shaft 27 to be rotatably driven. As a result, the axle assembly 12 is rotatably driven at the relatively low gear ratio provided by the high drive gears 37, 38, and 39. Such a relatively high gear ratio is well suited for providing the relatively low torque needed to accelerate the vehicle to a relatively high speed.

If it is desired to operate the vehicle at a further higher speed, the power drive unit 21 can be operated to disengage the high drive clutch 36 and engage the main drive clutch 26, while the low drive clutch 30 remains disengaged. As a result, the output shaft 27 is connected to the input shaft 22 for concurrent rotation. At the same time, the first control valve 42 and the second control valve 43 are each moved to their first positions. As described above, this prevents pressurized fluid from the accumulator 40 from flowing to the outputs of both the first pump/motor 34 and the second pump/motor 35. As a result, the first and second pump/motors 34 and 35 are isolated from the drive train system 10.

Under certain circumstances, the above-described components of the combined hybrid drive and brake system 20 can also be used to slow or stop the movement of the vehicle. To accomplish this, the main drive clutch 26 and the low drive clutch 30 are disengaged, while the high drive clutch 36 is engaged (in some instances, it may be preferable that the main drive clutch 26 and the high drive clutch 36 be disengaged, while the low drive clutch 30 is engaged). Regardless, the first control valve 42 and the second control valve 43 are each moved to (or maintained in) their second positions. This permits pressurized fluid from the first ports of both the first pump/motor 34 and the second pump/motor 35 to flow to the accumulator 40. Lastly, the first and second pump/motors 34 and 35 are each placed in a negative displacement mode, wherein they function as pumps to use the rotational energy of the rotating output shaft 27 to supply pressurized fluid to the accumulator 40. As a result, the output shaft 27 rotates the high drive gears 37, 38, and 39, which causes the first pump/motor 34 and the second pump/motor 35 to be rotatably driven. Consequently, the rotation of the axle assembly 12 is decelerated as the kinetic energy thereof is stored as fluid pressure in the accumulator 40.

It is often desirable to provide a separate brake system to affirmatively slow or stop the rotation of the axle assembly 12. As shown in FIG. 1, such a separate brake system is provided within the axle assembly 12 of the illustrated drive train system 10 as one or more brakes 45 associated with respective wheels of the vehicle. The brakes 45 are conventional in the art and may be actuated in any desired manner, such as pneumatically or hydraulically.

In the illustrated combined hybrid drive and brake system 20, pressurized fluid is used as the actuating mechanism. In such a hydraulic hybrid drive system, the accumulator 40 functions as the energy storage device, and the pump/motors 34 and 35 function as reversible hydraulic machines. Another commonly known hybrid drive system uses electricity as the actuating mechanism. In such an electric hybrid drive system, an electrical energy storage device (such as a capacitor or a battery) and a reversible electrical machine (such as generator/motor) are provided and function in a similar manner as described above. This invention is not intended to be limited to the specific structure of the hybrid drive system, but rather is intended to cover any similar structures.

Figure 2:
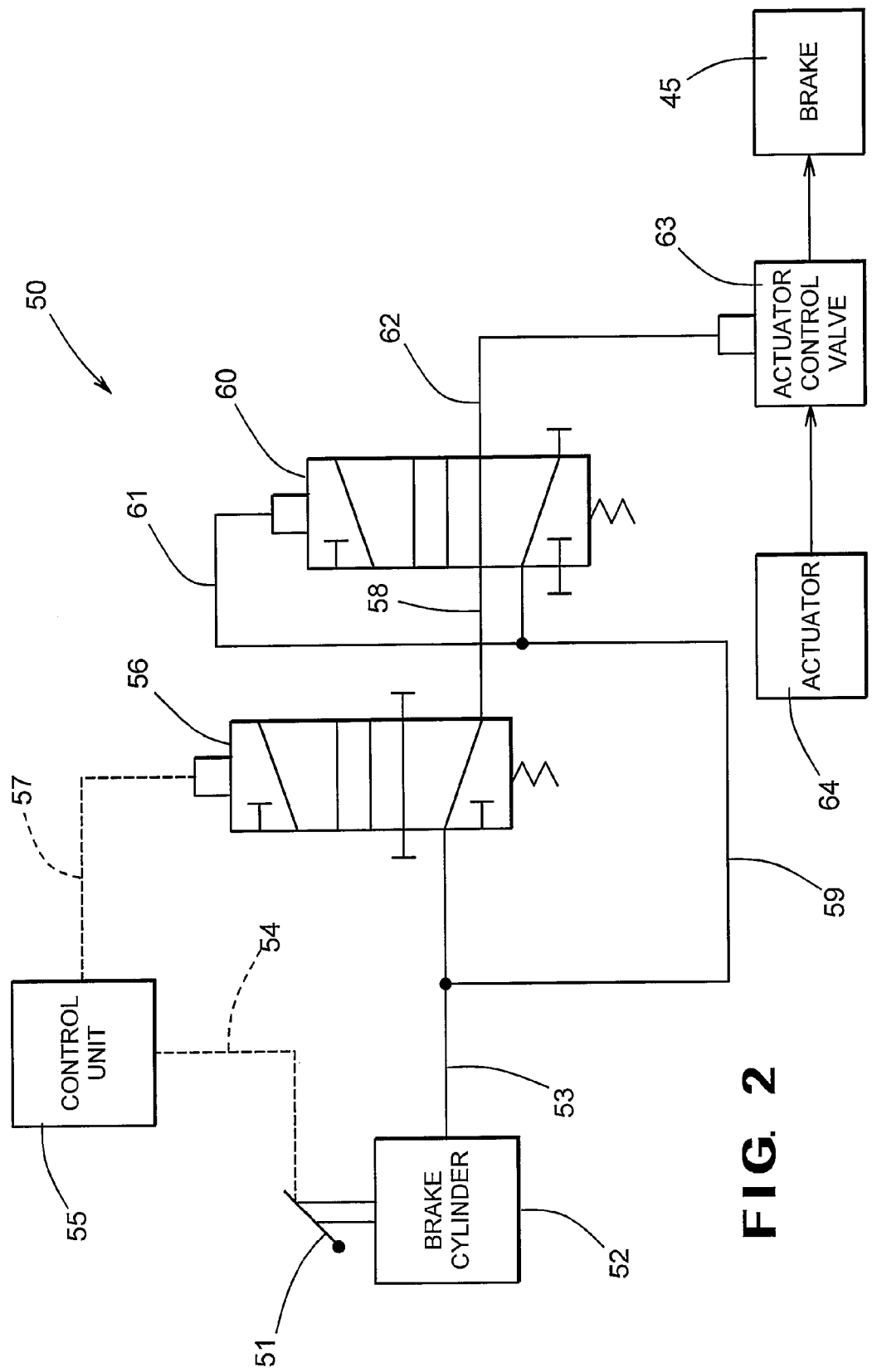
FIG. 2 is a schematic diagram of a first embodiment of a brake interface circuit for use with the combined hybrid drive and brake system illustrated in FIG. 1, shown in a first operating mode.

FIG. 2 is a schematic diagram of a first embodiment of a brake interface circuit, indicated generally at 50, for use with the combined hybrid drive and brake system 20 illustrated in FIG. 1. As shown therein, the first embodiment of the brake interface circuit 50 includes a brake pedal 51 that cooperates with a brake cylinder 52. The brake pedal 51 and the brake cylinder 52 are both conventional in the art. The brake pedal 51 can be embodied as any structure that can be manually depressed or otherwise operated by an operator of the drive train system 10 when it is desired to slow or stop rotation of the rotatably driven mechanism, such as the axle assembly 12. When the brake pedal 51 is depressed or otherwise operated, the brake cylinder 52 generates a flow of pressurized fluid in an output line 53. At the same time, the brake pedal 51 generates a signal over a line 54 to a control unit 55. The control unit 55 is conventional in the art and may be embodied as any electronic or otherwise programmable controller, such as an electronic control unit that is frequently provided in many vehicles. The signal that generated to the control unit 55 may be representative of any desired parameter of movement of the brake pedal 51 including, for example, magnitude of movement, speed or acceleration of movement, exceeding a minimum amount of movement, and the like.

The output line 53 from the brake cylinder 52 communicates with a first control valve 56. The illustrated first control valve 56 is a two-position, three-way, solenoid-operated valve. However, the first control valve 56 may be embodied as any structure that accomplishes the various modes of operation that are described below. The first control valve 56 may be oriented in either a first position (an upper position when viewing FIG. 2) or a second position (a lower position when viewing FIG. 2) as desired. The first control valve 56 may be normally biased to the first position by a conventional spring or other device, although such is not required. The operation of the first control valve 56 between the first and second positions can be controlled by the control unit 55 by means of output signals that are generated over a line 57 or by any other conventional means. The first control valve 56 has an output line 58. Additionally, a bypass line 59 communicates with the output line 53 from the brake cylinder 52.

The output line 58 from the first control valve 56 and the bypass line 59 from the output line 53 from the brake cylinder 52 both communicate with a second control valve 60. The illustrated second control valve 60 is a two-position, three-way, pressure-operated valve. However, the second control valve 60 may be embodied as any structure that accomplishes the various modes of operation that are described below. The second control valve 60 may also be oriented in either a first position (an upper position when viewing FIG. 2) or a second position (a lower position when viewing FIG. 2) as desired. The second control valve 60 may be normally biased to the first position by a conventional spring or other device, although such is not required. The operation of the second control valve 60 is controlled by the magnitude of pressurized fluid contained in a control line 61 that communicates with the bypass line 59. The second control valve 60 has an output line 62.

The output line 62 from the second control valve 60 communicates with an actuator control valve 63. The illustrated actuator control valve 63 is a pressure-operated relay valve. However, the actuator control valve 63 may be embodied as any structure that accomplishes the various modes of operation that are described below. The operation of the actuator control valve 63 is controlled by the pressure of the fluid in the output line 62 from the second control valve 60. The actuator control valve 63 is connected between an actuator 64 and the brake 45. The actuator 64 is conventional in the art and may be embodied as any desired source of pressurized fluid (either pneumatic or hydraulic) or any other desired device for selectively actuating the brake 45. Similarly, the brake 45 is conventional in the art and may be embodied as any desired structure that is responsive to the application of pressurized fluid (or other actuating means) from the actuator 64 for retarding the rotation of the rotatably driven mechanism, as described above. The actuator control valve 63 may be embodied as a normally closed valve (although such is not required), wherein fluid communication from the actuator 64 to the brake 45 is normally prevented, thereby disabling the operation of the brake 45. However, the actuator control valve 63 may be opened when pressurized fluid is supplied to a control port, allowing fluid communication from the actuator 64 to the brake 45 and thereby enabling the operation of the brake 45.

As discussed above, deceleration of the rotatably driven mechanism (i.e., the axle assembly 12 in the illustrated embodiment) can be accomplished by either (1) the brake system operating alone, (2) the hybrid drive system operating alone, or (3) both the brake system and the hybrid drive system operating in combination. The first embodiment of the brake interface circuit 50 can be operated in a first operating mode, wherein the brake 45 is enabled for operation when the brake pedal 51 is manually depressed or otherwise operated by an operator of the drive train system 10. The first embodiment of the brake interface circuit 50 can alternatively be operated in a second operating mode, wherein the brake 45 is disabled from operation when the brake pedal 51 is manually depressed or otherwise operated by an operator of the drive train system 10. Lastly, the first embodiment of the brake interface circuit 50 can be operated in a third operating mode, wherein the brake 45 is enabled for operation when the brake pedal 51 is manually depressed or otherwise operated by an operator of the drive train system 10, even though a portion of the first embodiment of the brake interface circuit 50 continues to be operated in the second operating mode.

FIG. 2 illustrates the first embodiment of the brake interface circuit 50 when it is operated in the first operating mode, wherein the brake 45 is enabled for operation when the brake pedal 51 is manually depressed or otherwise operated by an operator of the drive train system 10. In this first operating mode, the first control valve 56 is oriented in the first position (the upper position when viewing FIG. 2) and the second control valve 60 is oriented in the first position (the upper position when viewing FIG. 2). When the brake pedal 51 is depressed, the brake cylinder 52 generates a flow of pressurized fluid through the output line 53, the first control valve 56, the output line 58, the second control valve 60, and the output line 62 to the control port of the actuator control valve 63. As a result, the actuator control valve 63 is opened, thereby allowing fluid communication from the actuator 64 to the brake 45. Consequently, the brake 45 is enabled for operation by the actuator 64 when the brake pedal 51 is manually depressed or otherwise operated by an operator of the drive train system 10. When the brake pedal 51 is released, the flow of pressurized fluid from the brake cylinder 52 to the control port of the actuator control valve 63 is discontinued. As a result, the actuator control valve 63 is returned to its closed position, and the brake 45 is disabled from operation by the actuator 64.

Figure 3:
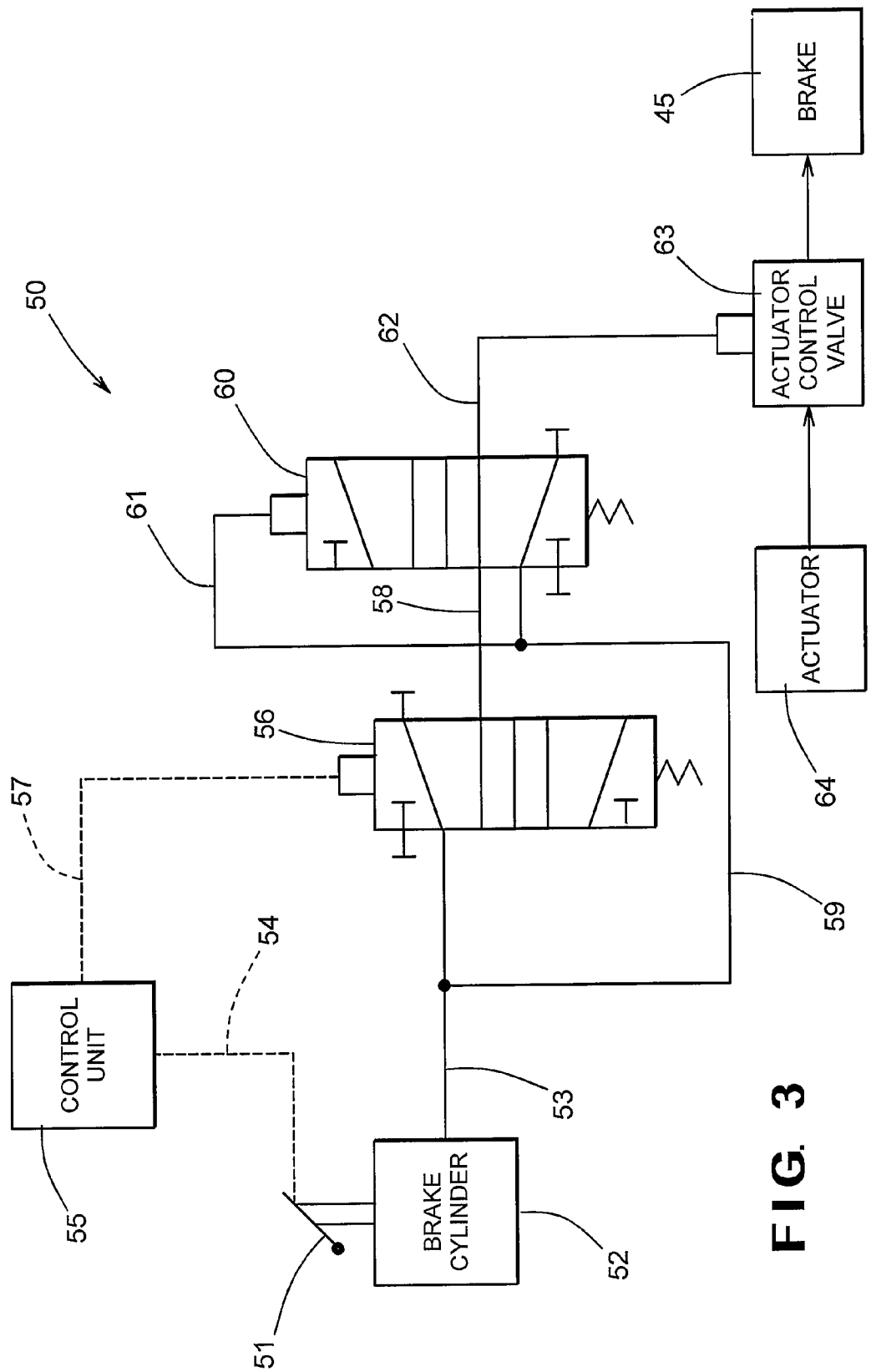
FIG. 3 is a schematic diagram of the first embodiment of the brake interface circuit illustrated in FIG. 2, shown in a second operating mode.

FIG. 3 illustrates the first embodiment of the brake interface circuit 50 when it is operated in the second operating mode, wherein the brake 45 is not enabled for operation when the brake pedal 51 is manually depressed or otherwise operated by an operator of the drive train system 10. In this second operating mode, the first control valve 56 is oriented in the second position (the lower position when viewing FIG. 2) and the second control valve 60 is oriented in the first position (the upper position when viewing FIG. 2). As a result, both the output line 53 and the bypass line 59 from the brake cylinder 52 are blocked by the first and second control valves 56 and 60, respectively. Thus, pressurized fluid from the brake cylinder 52 cannot be passed through either the first control valve 56 and the second control valve 60 to the control port of the actuator control valve 63. At the same time, the output line 62 is vented through the second control valve 60, the output line 58, and the first control valve 56 to prevent any residual pressurized fluid from being supplied to the control port of the actuator control valve 63. If the first embodiment of the brake interface circuit 50 is a pneumatically operated system, then such residual fluid may be vented to the atmosphere. Alternatively, if the first embodiment of the brake interface circuit 50 is a hydraulically operated system, then such residual fluid may be vented to the reservoir 44 or to a similar relatively low fluid pressure storage device. Regardless, when the first embodiment of the brake interface circuit 50 is operated in the second operating mode, the brake 45 is not enabled for operation by the actuator 64.

Thus, when it is desired to decelerate the rotatably driven mechanism by means of the brake system operating alone, the first embodiment of the brake interface circuit 50 is operated in the first operating mode. As discussed above, in this first operating mode, the brake 45 is enabled for operation when the brake pedal 51 is manually depressed or otherwise operated by an operator of the drive train system 10. Alternatively, when it is desired to decelerate the rotatably driven mechanism by means of the hybrid drive system operating alone, the first embodiment of the brake interface circuit 50 is operated in the second operating mode. As also discussed above, in this second operating mode, the brake 45 is not enabled for operation when the brake pedal 51 is manually or otherwise operated by an operator of the drive train system 10.

The first embodiment of the brake interface circuit 50 can be selectively operated in either of the first and second operating modes as desired in order to operate the combined hybrid drive and brake system 20 in the manner described above. To accomplish this, the first control valve 56 is moved between its first position (when the first embodiment of the brake interface circuit 50 is operated in the first operating mode) and its second position (when the first embodiment of the brake interface circuit 50 is operated in the second operating mode). In both of these operating modes, the second control valve 60 remains oriented in its first position. As a result of a failure, however, the first control valve 56 might become stuck in either of its first or second positions. If the first control valve 56 gets stuck in its first position, the first embodiment of the brake interface circuit 50 would (as described above) be operated such that the brake 45 is enabled for operation when the brake pedal 51 is manually depressed or otherwise operated by an operator of the drive train system 10. However, if the first control valve 56 gets stuck in its second position, the first embodiment of the brake interface circuit 50 would be operated such that the brake 45 is not enabled for operation when the brake pedal 51 is manually depressed or otherwise operated by an operator of the drive train system 10.

The first embodiment of the brake interface circuit 50 avoids this potentially undesirable situation by being operable in a third operating mode. By means of explanation, let it be assumed that the first embodiment of the brake interface circuit 50 is currently being operated in the second operating mode illustrated in FIG. 3 (wherein the brake 45 is not enabled for operation when the brake pedal 51 is manually depressed or otherwise operated by an operator of the drive train system 10) and it is desired to return the first embodiment of the brake interface circuit 50 to the first operating mode illustrated in FIG. 2 (wherein the brake 45 is enabled for operation when the brake pedal 51 is manually depressed or otherwise operated by an operator of the drive train system 10). If the first control valve 56 gets stuck in its second position illustrated in FIG. 3, the output line 62 is vented through the second control valve 60, the output line 58, and the first control valve 56, thereby preventing any pressurized fluid from being supplied to the control port of the actuator control valve 63, as described above.

Under normal circumstances, the brake pedal 51 is not depressed with a relatively large amount of force when the first embodiment of the brake interface circuit 50 is operated in the second operating mode. However, if the brake pedal 51 is depressed with a relatively large amount of force when the first embodiment of the brake interface circuit 50 is operated in the second operating mode, the brake cylinder 52 generates a flow of relatively high magnitude pressurized fluid through the output line 53 thereof and the bypass line 59 to the control line 61. As mentioned above, the operation of the second control valve 60 is controlled by the magnitude of the pressurized fluid contained in the control line 61, which communicates with the bypass line 59. When the magnitude of the pressurized fluid contained in the control line 61 exceeds a predetermined threshold value, then the first embodiment of the brake interface circuit 50 will be operated in the third operating mode illustrated in FIG. 4. This occurs because the application of relatively high magnitude pressurized fluid from the control line 61 to the second control valve 60 causes the second control valve 60 to be moved from its first position (the upper position when viewing FIGS. 2 and 3) to its second position (the lower position when viewing FIG. 4).

When the second control valve 60 is in its second position, then the pressurized fluid in the bypass line 59 is supplied through the second control valve 60 and the output line 62 to the control port of the actuator control valve 63. As a result (as described above in connection with the first operating mode), the actuator control valve 63 is opened, thereby allowing fluid communication from the actuator 64 to the brake 45. Consequently, the brake 45 is enabled for operation by the actuator 64 when the brake pedal 51 is manually depressed or otherwise operated by an operator of the drive train system 10.

Figure 4:
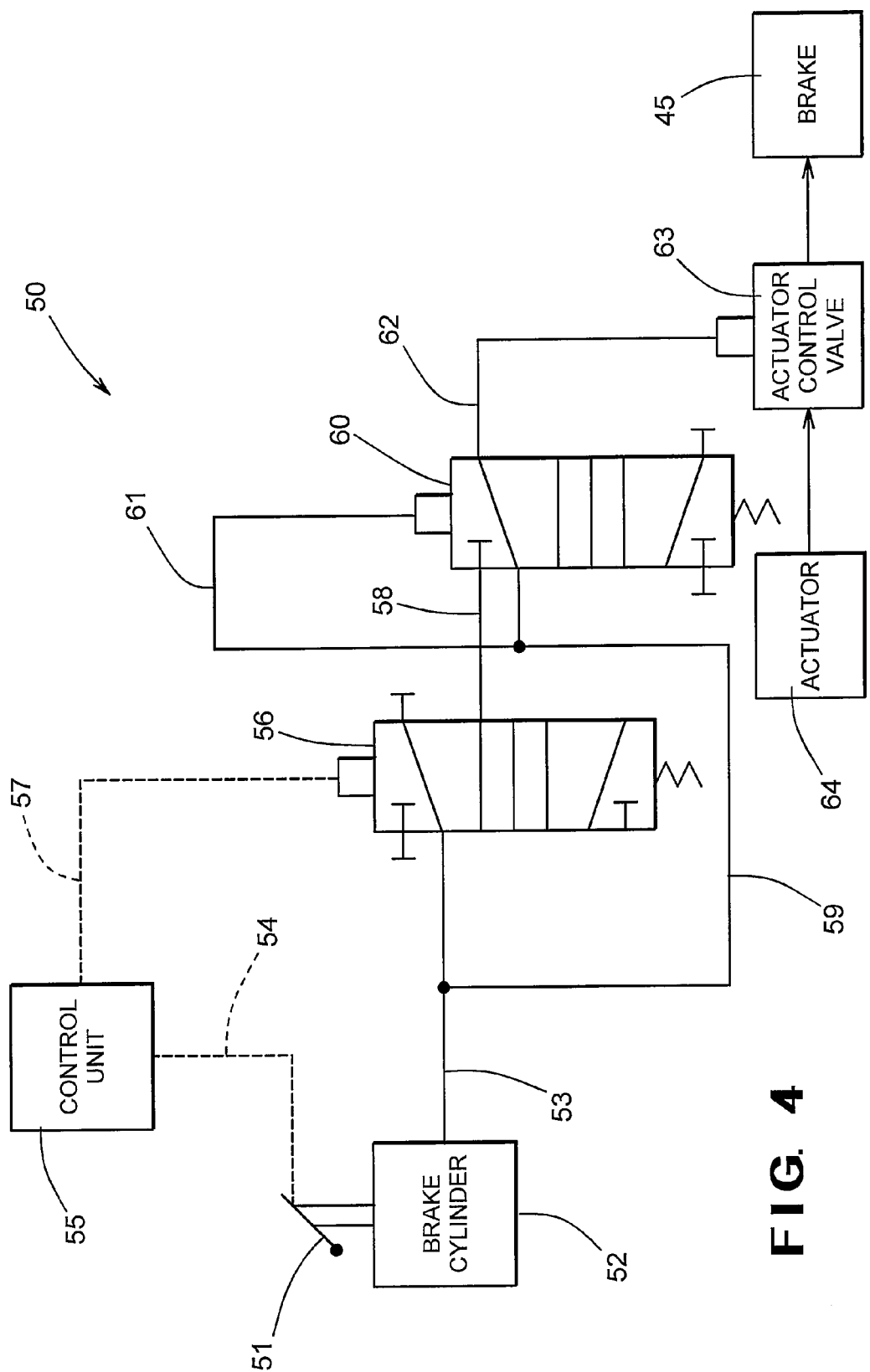
FIG. 4 is a schematic diagram of the first embodiment of the brake interface circuit illustrated in FIGS. 2 and 3, shown in a third operating mode.

Thus, FIG. 4 illustrates the first embodiment of the brake interface circuit 50 when it is operated in the third operating mode, which can be considered a fail-safe mode of operation. In this first embodiment of the brake interface circuit 50, therefore, it can be seen that the first and second control valves 56 and 60 are arranged in a series relationship, wherein the flow of pressurized fluid from the brake cylinder 52 passes through both of the first and second control valves 56 and 60 to the actuator control valve 63.

Figure 5:
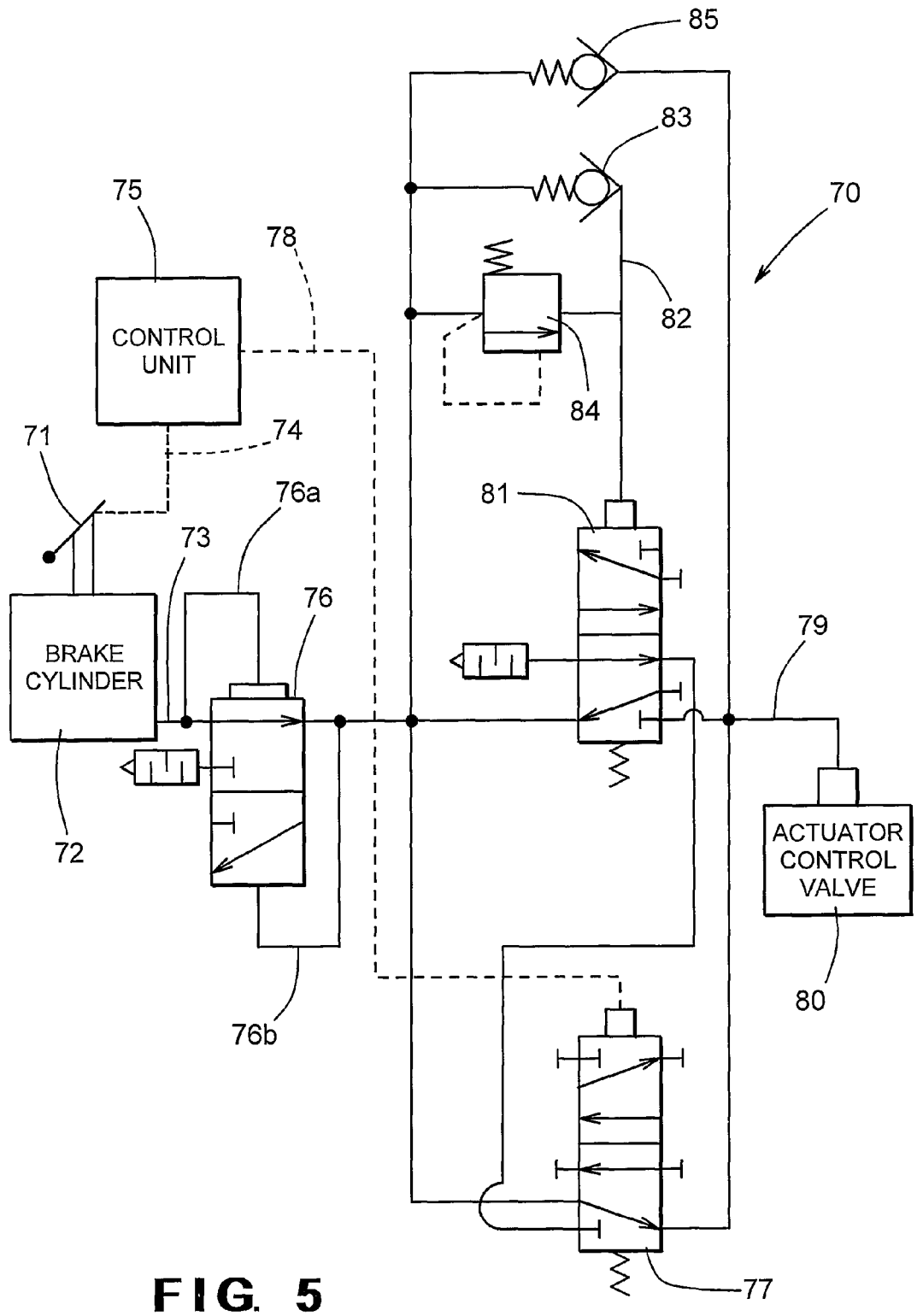
FIG. 5 is a schematic diagram of a second embodiment of a brake interface circuit for use with the combined hybrid drive and brake system illustrated in FIG. 1, shown in a first operating mode.

FIG. 5 is a schematic diagram of a second embodiment of a brake interface circuit, indicated generally at 70, for use with the combined hybrid drive and brake system 20 illustrated in FIG. 1. As shown therein, the brake interface circuit 70 includes a brake pedal 71 that cooperates with a brake cylinder 72. The brake pedal 71 and the brake cylinder 72 are both conventional in the art. The brake pedal 71 can be embodied as any structure that can be manually depressed or otherwise operated by an operator of the drive train system 10 when it is desired to slow or stop rotation of the rotatably driven mechanism, such as the axle assembly 12. When the brake pedal 70 is depressed or otherwise operated, the brake cylinder 72 generates a flow of pressurized fluid in an output line 73. At the same time, the brake pedal 71 generates a signal over a line 74 to a control unit 75. The control unit 75 is conventional in the art and may be embodied as any electronic or otherwise programmable controller, such as an electronic control unit that is frequently provided in many vehicles. The signal that generated to the control unit 75 may be representative of any desired parameter of movement of the brake pedal 71 including, for example, magnitude of movement, speed or acceleration of movement, exceeding a minimum amount of movement, and the like.

The output line 73 from the brake cylinder 72 selectively communicates through a pressure venting valve 76 with a first control valve 77. The pressure venting valve 76 is conventional in the art and may be oriented in either a first position (a lower position when viewing FIG. 5), wherein the output line 73 communicates with the first control valve 77, or a second position (an upper position when viewing FIG. 5), wherein the output line 73 does not communicate with the first control valve 77. Movement of the pressure venting valve 76 can be controlled by a first control line 76a, which communicates with the output line 73 from the brake cylinder 72, and a second control line 76b, which communicates with the first control valve 77. The purpose and operation of the pressure venting valve 76 will be explained below.

The illustrated first control valve 77 is a two-position, three-way, solenoid-operated valve. However, the first control valve 77 may be embodied as any structure that accomplishes the various modes of operation that are described below. The first control valve 77 may be oriented in either a first position (an upper position when viewing FIG. 5) or a second position (a lower position when viewing FIG. 5) as desired. The first control valve 77 may be normally biased to this first position by a conventional spring or other device, although such is not required. The operation of the first control valve 77 between the first and second positions is controlled by the control unit 75 by means of output signals that are generated over a line 78. The first control valve 77 has communicates with an input line 79 of an actuator control valve 80. The illustrated actuator control valve 80 is a pressure-operated relay valve and may be the same, both structurally and operationally, as the actuator control valve 63 described above. However, the actuator control valve 80 may be embodied as any structure that accomplishes the various modes of operation that are described below. The operation of the actuator control valve 80 is controlled by the pressure of the fluid in the input line 79. As shown in FIGS. 2, 3, and 4 and as described above, the actuator control valve 80 can be connected between the actuator 64 and the brake 45 for the same purposes as described above. The actuator control valve 80 may be embodied as a normally closed valve (although such is not required), wherein fluid communication from the actuator 64 to the brake 45 is normally prevented, thereby disabling the operation of the brake 45. However, the actuator control valve 80 may be opened when pressurized fluid is supplied to a control port, allowing fluid communication from the actuator 64 to the brake 45 and thereby enabling the operation of the brake 45.

The output line 73 from the brake cylinder 72 also communicates through the pressure venting valve 76 with a second control valve 81. The illustrated second control valve 81 is a two-position, three-way, pressure-operated valve. However, the second control valve 81 may be embodied as any structure that accomplishes the various modes of operation that are described below. The second control valve 81 may be oriented in either a first position (an upper position when viewing FIG. 5) or a second position (a lower position when viewing FIG. 5) as desired. The second control valve 81 may be normally biased to this first position by a conventional spring or other device, although such is not required. The operation of the second control valve 81 is controlled by the magnitude of pressurized fluid contained in a control line 82. The output line 73 from the brake cylinder 72 communicates through the pressure venting valve 76 with a first check valve 83 that, in turn, communicates with the control line 82 to the second control valve 81. The first check valve 83 permits fluid to flow therethrough from the control line 82 to the pressure venting valve 76, but prevents fluid from flowing therethrough from the pressure venting valve 76 to the control line 82. The output line 73 from the brake cylinder 72 further communicates through the pressure venting valve 76 with a pressure setting valve 84 that, in turn, communicates with the control line 82 to the second control valve 81. The operations of the second control valve 81, the first check valve 83, and the pressure setting valve 84 will be explained below.

Lastly, the output line 73 from the brake cylinder 72 communicates through the pressure venting valve 76 with a second check valve 85 that, in turn, communicates with the input line 79 of the actuator control valve 80. The second check valve 83 permits fluid to flow therethrough from the input line 79 of the actuator control valve 80 to the pressure venting valve 76, but prevents fluid from flowing therethrough from the pressure venting valve 76 the input line 79 of the actuator control valve 80. The operation of the second check valve 85 will also be explained below.

As discussed above, deceleration of the rotatably driven mechanism (i.e., the axle assembly 12 in the illustrated embodiment) can be accomplished by either (1) the brake system operating alone, (2) the hybrid drive system operating alone, or (3) both the brake system and the hybrid drive system operating in combination. The second embodiment of the brake interface circuit 70 can be operated in a first operating mode, wherein the brake 45 is enabled for operation when the brake pedal 71 is manually depressed or otherwise operated by an operator of the drive train system 10. The second embodiment of the brake interface circuit 70 can alternatively be operated in a second operating mode, wherein the brake 45 is not enabled for operation when the brake pedal 71 is manually depressed or otherwise operated by an operator of the drive train system 10. Lastly, the second embodiment of the brake interface circuit 70 can be operated in a third operating mode, wherein the brake 45 is enabled for operation when the brake pedal 71 is manually depressed or otherwise operated by an operator of the drive train system 10, even though a portion of the second embodiment of the brake interface circuit 70 continues to be operated in the second operating mode.

FIG. 5 illustrates the second embodiment of the brake interface circuit 70 when it is operated in the first operating mode, wherein the brake 45 is enabled for operation when the brake pedal 71 is manually depressed or otherwise operated by an operator of the drive train system 10. In this first operating mode, the pressure venting valve 76 is oriented in the first position (the lower position when viewing FIG. 5), the first control valve 77 is oriented in the first position (the upper position when viewing FIG. 5), and the second control valve 81 is oriented in the first position (the upper position when viewing FIG. 5). When the brake pedal 71 is depressed, the brake cylinder 72 generates a flow of pressurized fluid through the output line 73 thereof. A portion of this pressurized fluid can be used to orient the pressure venting valve 76 in the first position by means of the first control line 76*a*.

Additionally, when the brake pedal 71 is depressed, the brake cylinder 72 generates a flow of pressurized fluid through the pressure venting valve 76, the pressure venting valve 76, and the input line 79 to the control port of the actuator control valve 80. As a result, the actuator control valve 80 is opened, thereby allowing fluid communication from the actuator 64 to the brake 45 as described above. Consequently, the brake 45 is enabled for operation by the actuator 64 when the brake pedal 71 is manually depressed or otherwise operated by an operator of the drive train system 10. When the brake pedal 71 is released, the flow of pressurized fluid from the brake cylinder 72 to the control port of the actuator control valve 80 is discontinued. As a result, the actuator control valve 80 is returned to its closed position, and the brake 45 is not enabled for operation by the actuator 64.

Also in this first operating mode, when the brake pedal 71 is depressed, the brake cylinder 72 generates a flow of pressurized fluid through the output line 73 thereof and the pressure venting valve 76 to the second check valve 85. As described above, the second check valve 85 prevents fluid flow therethrough from the pressure venting valve 76 to the input line 79 of the actuator control valve 80. However, such pressurized fluid balances the pressurized fluid that is present in the input line 79 of the actuator control valve 80, thereby preventing any loss of the pressure fluid that is applied to the control port of the actuator control valve 80. Accordingly, the actuator control valve 80 is maintained in its closed position, and the brake 45 is not enabled for operation by the actuator 64.

Figure 6:
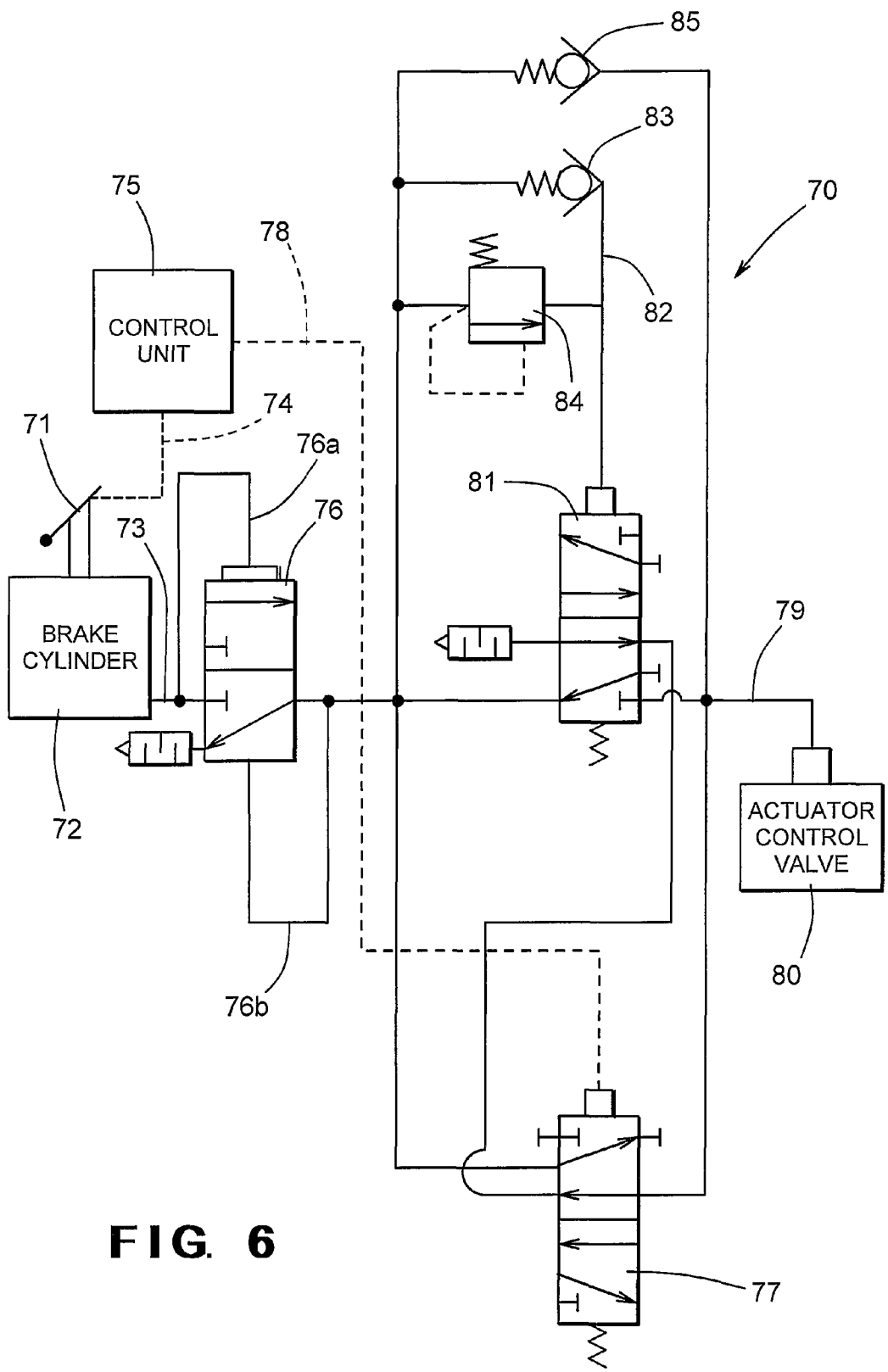
FIG. 6 is a schematic diagram of the second embodiment of the brake interface circuit illustrated in FIG. 5, shown in a second operating mode.

FIG. 6 illustrates the brake interface circuit 70 when it is operated in the second operating mode, wherein the brake 45 is not enabled for operation when the brake pedal 71 is manually depressed or otherwise operated by an operator of the drive train system 10. In this second operating mode, the pressure venting valve 76 is oriented in the second position (the upper position when viewing FIG. 5), the first control valve 77 is oriented in the second position (the lower position when viewing FIG. 5), and the second control valve 81 is oriented in the first position (the upper position when viewing FIG. 5). As a result, the output line 73 from the brake cylinder 72 is blocked by the pressure venting valve 76. Thus, pressurized fluid from the brake cylinder 72 cannot be passed through to the control port of the actuator control valve 80. At the same time, the input line 79 to the actuator control valve 80 is vented both (1) through the first control valve 77 and the second control valve 81 and (2) through the second check valve 85 and the pressure venting valve 76, thereby preventing any residual pressurized fluid from being continued to be supplied to the control port of the actuator control valve 80. A portion of this residual pressurized fluid can be used to orient the pressure venting valve 76 in the second position by means of the second control line 76*b*. If the second embodiment of the brake interface circuit 70 is a pneumatically operated system, then the above-described components may be vented to the atmosphere. Alternatively, if the second embodiment of the brake interface circuit 70 is a hydraulically operated system, then the above-described components may be vented to the reservoir 44 or similar relatively low fluid pressure storage device. Regardless, when the second embodiment of the brake interface circuit 70 is operated in the second operating mode, the brake 45 is not enabled for operation by the actuator 64 regardless of whether or not the brake pedal 71 is manually depressed or otherwise operated by an operator of the drive train system 10.

Thus, when it is desired to decelerate the rotatably driven mechanism by means of the brake system operating alone, the second embodiment of the brake interface circuit 70 is operated in the first operating mode. As discussed above, in this first operating mode, the brake 45 is enabled for operation when the brake pedal 71 is manually depressed or otherwise operated by an operator of the drive train system 10. Alternatively, when it is desired to decelerate the rotatably driven mechanism by means of the hybrid drive system operating alone, the second embodiment of the brake interface circuit 70 is operated in the second operating mode. As also discussed above, in this second operating mode, the brake 45 is not enabled for operation when the brake pedal 71 is manually depressed or otherwise operated by an operator of the drive train system 10.

The second embodiment of the brake interface circuit 70 can be selectively operated in either of the first and second operating modes as desired in order to operate the combined hybrid drive and brake system 20 in the manner described above. To accomplish this, the pressure venting valve 76 and the first control valve 77 are moved between their first positions (when the second embodiment of the brake interface circuit 70 is operated in the first operating mode) and their second positions (when the second embodiment of the brake interface circuit 70 is operated in the second operating mode). In both of these operating modes, the second control valve 81 remains oriented in its first position. As the result of a failure, however, the first control valve 77 might become stuck in either of its first or second positions. If the first control valve 77 gets stuck in its first position, the second embodiment of the brake interface circuit 70 would (as described above) be operated such that the brake 45 is enabled for operation when the brake pedal 71 is manually depressed or otherwise operated by an operator of the drive train system 10. However, if the first control valve 77 gets stuck in its second position, the second embodiment of the brake interface circuit 70 would be operated such that the brake 45 is not enabled for operation when the brake pedal 71 is manually depressed or otherwise operated by an operator of the drive train system 10.

The second embodiment of the brake interface circuit 70 avoids this potentially undesirable situation by being operable in a third operating mode. By means of explanation, let it be assumed that the second embodiment of the brake interface circuit 70 is currently being operated in the second operating mode illustrated in FIG. 6 (wherein the brake 45 is not enabled for operation when the brake pedal 71 is manually depressed or otherwise operated by an operator of the drive train system 10) and it is desired to return the second embodiment of the brake interface circuit 70 to the first operating mode illustrated in FIG. 5 (wherein the brake 45 is enabled for operation when the brake pedal 71 is manually depressed or otherwise operated by an operator of the drive train system 10). If the first control valve 77 gets stuck in its second position illustrated in FIG. 6, the input line 79 to the actuator control valve 80 is vented through both (1) the first control valve 77 and the second control valve 81 and (2) the second check valve 85 and the pressure venting valve 76, thereby preventing any pressurized fluid from being supplied to the control port of the actuator control valve 80, as described above. Normally, the brake pedal 71 is not depressed when the second embodiment of the brake interface circuit 70 is operated in the second operating mode.

Figure 7:
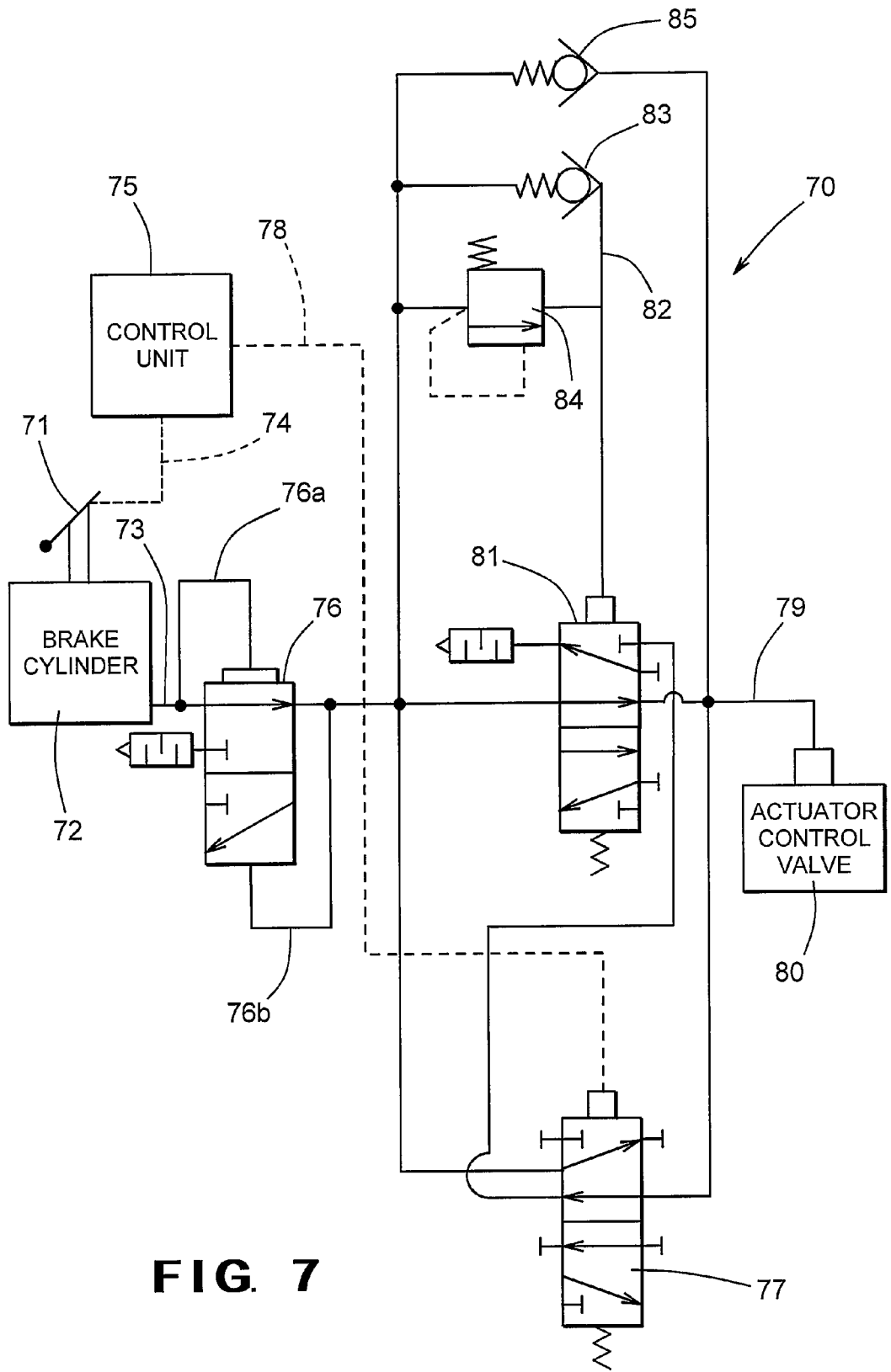
FIG. 7 is a schematic diagram of the second embodiment of the brake interface circuit illustrated in FIGS. 5 and 6, shown in a third operating mode.

However, if the brake pedal 71 is depressed with a relatively large amount of force when the second embodiment of the brake interface circuit 70 is operated in the second operating mode, the brake cylinder 72 generates a flow of relatively high magnitude pressurized fluid through the output line 73 thereof and the first control line 76a, thereby re-orienting the pressure venting valve 76 back to its first position, as shown in FIG. 7. Therefore, pressurized fluid flows through the pressure venting valve 76 to the pressure setting valve 84. In response thereto, the pressure setting valve 84 is moved to a position wherein the pressurized fluid from the pressure venting valve 76 is supplied to the control line 82. As mentioned above, the operation of the second control valve 81 is controlled by the magnitude of the pressurized fluid contained in the control line 82. When the magnitude of the pressurized fluid contained in the control line 82 exceeds a predetermined threshold value, then the second embodiment of the brake interface circuit 70 will be operated in the third operating mode illustrated in FIG. 7. This occurs because the application of relatively high magnitude pressurized fluid from the control line 82 to the second control valve 81 causes the second control valve 81 to be moved from its first position (the upper position when viewing FIGS. 5 and 6) to its second position (the lower position when viewing FIG. 7).

When the second control valve 81 is in this second position, then the pressurized fluid from the pressure venting valve 76 is supplied through the second control valve 81 to the input line 79 and, therefore, to the control port of the actuator control valve 80. As a result (as described above in connection with the first operating mode), the actuator control valve 80 is opened, thereby allowing fluid communication from the actuator 64 to the brake 45. Consequently, the brake 45 is enabled for operation by the actuator 64 when the brake pedal 71 is manually depressed or otherwise operated by an operator of the drive train system 10. Thus, FIG. 7 illustrates the second embodiment of the brake interface circuit 70 when it is operated in the third operating mode, which can be considered a fail-safe mode of operation. In this second embodiment of the brake interface circuit 70, therefore, it can be seen that the first and second control valves 77 and 81 are arranged in a parallel relationship, wherein the flow of pressurized fluid from the brake cylinder 72 passes through either, but not both, of the first and second control valves 77 and 81 to the actuator control valve 80.

The principle and mode of operation of this invention have been explained and illustrated in its preferred embodiments. However, it must be understood that this invention may be practiced otherwise than as specifically explained and illustrated without departing from its spirit or scope.

What is claimed is:
1. A brake interface circuit that is adapted to selectively enable and disable the operation of a brake by an actuator, the brake interface circuit comprising:
   an actuator control valve adapted to be connected between an actuator and a brake and responsive to a controlling pressurized fluid for selectively enabling and disabling a flow of a braking pressurized fluid from the actuator to the brake; and
   first and second control valves adapted to be connected to a brake cylinder and connected to the actuator control valve, the first control valve being a solenoid-operated valve and the second control valve being a pressure-operated valve responsive to the controlling pressurized fluid, the first and second control valves being operable in:
   (1) a first operating mode, wherein the controlling pressurized fluid is allowed to flow from the brake cylinder sequentially through the first control valve and the second control valve to the actuator control valve, thereby causing the actuator control valve to permit the braking pressurized fluid to flow from the actuator to the brake and, therefore, operation of the brake by the actuator;
   (2) a second operating mode, wherein the controlling pressurized fluid is not allowed to flow through either the first control valve or the second control valve from the brake cylinder to the actuator control valve, thereby causing the actuator control valve to prevent the braking pressurized fluid from flowing from the actuator to the brake and, therefore, operation of the brake by the actuator; and
   (3) a third operating mode, wherein the controlling pressurized fluid is allowed to flow through only the second control valve and not the first control valve from the brake cylinder to the actuator control valve, thereby causing the actuator control valve to permit the braking pressurized fluid to flow from the actuator to the brake and, therefore, operation of the brake by the actuator.

2. The brake interface circuit defined in claim 1 wherein when the first and second control valves are in the first operating mode, the first control valve is in a first position and the second control valve is in a first position.

3. The brake interface circuit defined in claim 2 wherein when the first and second control valves are in the second operating mode, the first control valve is in a second position and the second control valve is in the first position.

4. The brake interface circuit defined in claim 3 wherein when the first and second control valves are in the third operating mode, the first control valve is in the second position and the second control valve is in a second position.

5. The brake interface circuit defined in claim 1 wherein the first and second control valves are connected in series with the actuator control valve.

6. A combined hybrid drive and brake system comprising:
   a hybrid drive system that is adapted to selectively decelerate a rotatably driven mechanism, accumulate the energy resulting from such deceleration, and use the accumulated energy to subsequently accelerate the rotatably driven mechanism;
   an actuator that actuates a brake to selectively decelerate the rotatably driven mechanism; and
   a brake interface circuit including:
   an actuator control valve connected between the actuator and the brake and responsive to a controlling pressurized fluid for selectively enabling and disabling a flow of a braking pressurized fluid from the actuator to the brake; and
   first and second control valves connected between a brake cylinder and the actuator control valve, the first control valve being a solenoid-operated valve and the second control valve being a pressure-operated valve responsive to the controlling pressurized fluid, the first and second control valves being operable in:

(1) a first operating mode, wherein the controlling pressurized fluid is allowed to flow from the brake cylinder sequentially through the first control valve and the second control valve to the actuator control valve, thereby causing the actuator control valve to permit the braking pressurized fluid to flow from the actuator to the brake and, therefore, operation of the brake by the actuator;

(2) a second operating mode, wherein the controlling pressurized fluid is not allowed to flow through either the first control valve or the second control valve from the brake cylinder to the actuator control valve, thereby causing the actuator control valve to prevent the braking pressurized fluid from flowing from the actuator to the brake and, therefore, operation of the brake by the actuator; and (3) a third operating mode, wherein the controlling pressurized fluid is allowed to flow through only the second control valve and not the first control valve from the brake cylinder to the actuator control valve, thereby causing the actuator control valve to permit the braking pressurized fluid to flow from the actuator to the brake and, therefore, operation of the brake by the actuator.

7. The combined hybrid drive and brake system defined in claim 6 wherein when the first and second control valves are in the first operating mode, the first control valve is in a first position and the second control valve is in a first position.

8. The combined hybrid drive and brake system defined in claim 7 wherein when the first and second control valves are in the second operating mode, the first control valve is in a second position and the second control valve is in the first position.

9. The combined hybrid drive and brake system defined in claim 8 wherein when the first and second control valves are in the third operating mode, the first control valve is in the second position and the second control valve is in a second position.

10. The combined hybrid drive and brake system defined in claim 6 wherein the first and second control valves are connected in series with the actuator control valve.

\* \* \* \* \*